April 15, 1969 C. W. WINNEMANN 3,438,703
TRANSPARENCY PROJECTION ACCESSORY
Filed Nov. 28, 1966
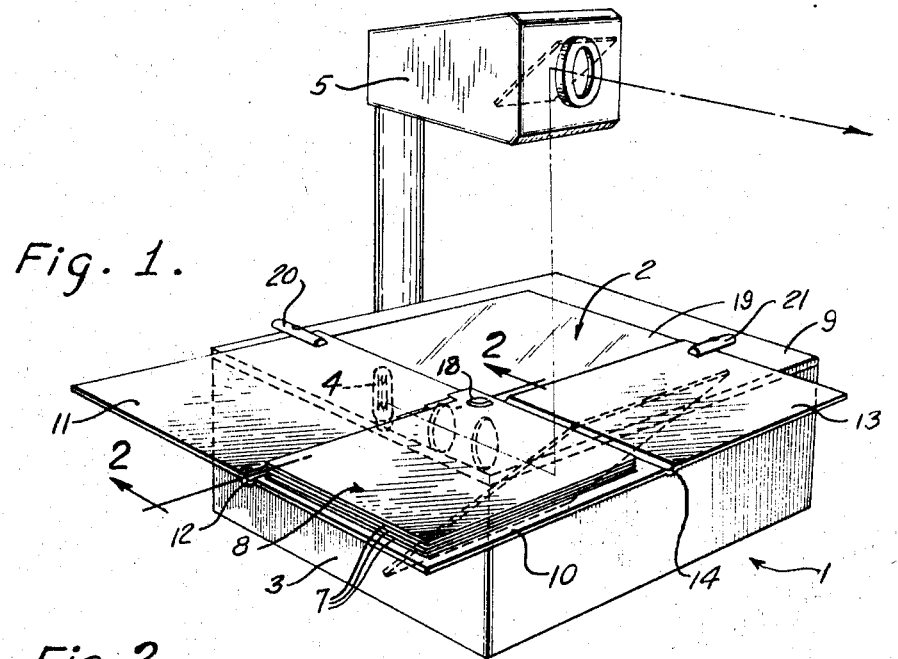
Fig. 1.
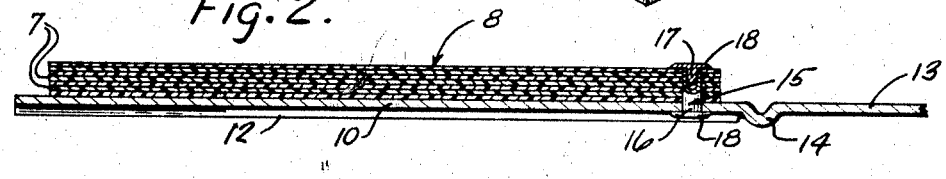
Fig. 2.
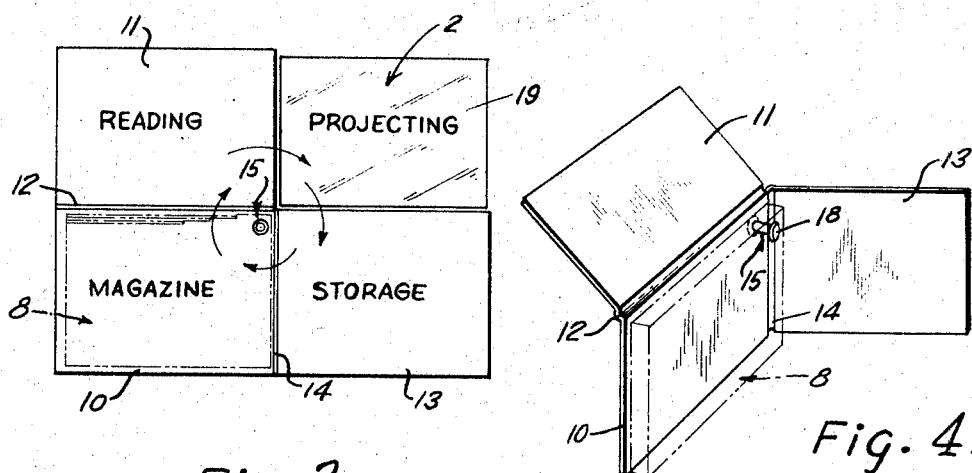
Fig. 3.
Fig. 4.
INVENTOR.
CARL W. WINNEMANN
BY
Andrus & Starke
ATTORNEYS

United States Patent Office 3,438,703
Patented Apr. 15, 1969

3,438,703
TRANSPARENCY PROJECTION ACCESSORY
Carl W. Winnemann, 11666 N. St. James Lane, 28W,
Mequon, Wis. 53092
Filed Nov. 28, 1966, Ser. No. 597,335
Int. Cl. G03b 21/54
U.S. Cl. 353—120                                              10 Claims

ABSTRACT OF THE DISCLOSURE

An accessory for use with an overhead projector comprising a magazine having a stack of bound transparencies which can be rotated through 360 degrees. A pivot pin connects a corner of the magazine to the base of a L-shaped self-supporting cover, having two further supports secured to adjacent edges of the base. The auxiliary supports are hinged to the base support to permit folding over the magazine for convenience of storage and filing. In the expanded position, the supports are releasably secured by any suitable device to the edges of the overhead projector with the viewing area lying between the two auxiliary covers. The magazine is secured to the overhead projector with the pivot pin adjacent an outer corner of the viewing screen. The transparencies are rotated ninety degrees to the one cover for reading, one hundred and eighty degree for viewing and two hundred and seventy degree to the third support for temporary storage while other transparencies are being shown.

---

This invention relates to a transparency projection apparatus and particularly to such apparatus employing an overhead type projector for the visual display of the subject matter carried by individual or superimposed transparencies.

In material presentation for teaching and general group information transmittal, overhead projectors have been recently used to visually display the information printed on a small transparency onto a large viewing area such as a screen, wall or the like. The transparency is a relatively small clear plastic sheet upon which information is printed or otherwise superimposed thereon. The transparency is placed on a horizontal illuminating portion or window of the overhead projector which includes an overhead lens and mirror unit to project the information in an approximately horizontal direction to a suitable viewing means which may be conveniently placed for group viewing. This system has been found to provide a very acceptable and advantageous means of presenting information to groups.

In a presentation, a plurality of the transparencies can be provided for sequential presentation of information. Often it is desirable to superimpose transparencies to modify a basic illustration without requiring complete reproducing of the material on the original or base transparency.

The transparencies are preferably bound into a book or magazine unit for storage, maintenance of proper organization of the material, sequence and convenience of manipulation during presentation. The bound transparencies may be provided with interleaved accompanying references or descriptive material.

Although bound transparency assemblies are available, they generally do not permit convenient changes in the subject matter by addition, removal and substitution of individual transparencies and permit superimposing of only immediately adjacent transparencies in the group of bound transparencies.

The present invention is particularly directed to interconnected or bound transparencies which can be selectively placed in an overhead projector for viewing, singly or in any combination and which provides means for ready and convenient replacement, addition or removal of the transparencies in the interconnected transparencies. The transparencies are bound in a convenient means to permit storing, movement and use of the transparencies.

In accordance with the present invention, a plurality of generally similar transparencies are assembled in superimposed stacked relation. The transparencies are preferably formed with the information applied or printed to the underside thereof. A single pivot support means interconnects the stack of transparencies. The pivot means has a pivot axis perpendicular to the principal plane of the transparencies and the associated reference sheets. This permits horizontal rotational movement of the transparencies in any combination for simultaneous projection or for separate and individual projection. The pivot means is preferably a releasably interconnected two-piece unit to permit changes in the transparencies and reference material in a simple and inexpensive manner.

In accordance with a preferred construction, the pivot means is provided in a corner of the magazine and the stacked transparencies are secured to the overhead projector with the pivot means adjacent an outer corner of the viewing screen. The transparencies then can be rotated from the initial starting or magazine position to a 90 degree position for reading, to a 180 degree position for viewing and to two hundred and seventy degree position for temporary storage while other transparencies are being shown. They may be shown individually or in any desired combination as a result of the single pivot connection. This thus provides a highly improved method of presentation while retaining simplicity of construction.

The transparencies may be interconnected as a part of a self-supporting cover structure wherein a magazine base or support is provided to which the transparencies are connected. Additional covers or supports are secured to adjacent edges of the base as to define a generally L-shaped supporting structure. The auxiliary supports are hinged to the base support to permit folding over the magazine for convenience of storage and filing. In the expanded position, the supports are releasably secured by any suitable means to the edges of the overhead projector with the viewing area lying between the two auxiliary covers. This will automatically position the magazine of transparencies.

The construction of the transparency magazine and method of presentation based on the teachings of this application have been found to provide a highly convenient, economical and practical visual display system for maximum efficiency of communication.

The drawing furnished herewith illustrates an embodiment of the present invention in which the above advantages and features are clearly disclosed as well as others which will be clear from the following description of such drawing.

In the drawing:

FIG. 1 is a pictorial view of an overhead projector with a tranparency magazine constructed in accordance with the present invention mounted thereon;

FIG. 2 is an enlarged cross section through the transparencies showing a pivot interconnection in accordance with one aspect of the present invention;

FIG. 3 is an enlarged diagrammatic illustration from the top of the projector showing the various possible positions of the individual transparencies; and FIG. 4 is a pictorial view of the magazine removed from the projector.

Referring to the drawing and particularly to FIG. 1, an overhead projector 1 of a well known construction is shown having a light transmitting transparent portion or window 2 in the upper wall of a supporting housing 3. A lamp and light directing assembly 4 is disposed beneath the window 2 and transmits light upwardly therethrough. A mirror and lens overhead unit 5 is mounted in upwardly spaced alignment with the window 2. The overhead unit 5 transmits the light horizontally and/or upwardly in accordance with any desired positioning of unit 5 into engagement with a suitable viewing screen, wall or the like, not shown. Transparencies 7 are sequentially placed, separately or in superposed groups, over the window 2 to transmit the information carried thereby onto the screen. Suitable supporting legs, not shown, may be provided to locate the upper wall of the housing at a convenient height for placement of the transparencies while standing adjacent the projector.

In the present invention, the transparencies 7 are bound as a special magazine 8 of stacked related tranparencies and a stage 9 is disposed on the top of the housing 3 to adapt the projector 1 to receive the magazine 8. Each transparency 7 is a generally rectangular clear plastic having information printed or otherwise applied to the underside as shown in FIG. 2.

Additionally, reference reading sheets may be interposed within the stack of transparencies and referred to while showing certain transparencies. Suitable indexing cutout or tabs may also be provided on each transparency 7 or a group thereof for rapid reference purposes.

The particular informational material on the transparencies, the material from which the transparencies are formed and the construction of the overhead projector are known and consequently no further description thereof is given.

In accordance with the illustrated embodiment of the present invention, the transparency magazine 8 includes an L-shaped outer support and cover structure which may be formed of any suitable rigid material; for example, a rigid cardboard, plastic or the like. The structure includes a rectangular base cover and support 10 somewhat larger than the individual transparencies 7. A first lateral cover and support 11 of substantially the same configuration as support 10 is secured by a suitable hinge means 12 along the edge of the base support 10. A similar lateral cover and support 13 is similarly connected by a hinge means 14 along the short edge of the rectangular base support 10. In the illustrated embodiment of the invention, the base support 10 and the lateral supports 11 and 13 are formed of a suitable stiff paper material with the hinges formed by flexible integral connections. In the expanded position, the lateral supports 11 and 13 extend from the base support to define an L-shaped structure for supporting the transparencies 7 on the stage 9.

The transparencies 7 are stacked over the base support 10 and interconnected to each other and to the support 10 by a pivot unit 15 at the corner of support 10 common to both of the lateral supports 11 and 13. In the illustrated embodiment of the invention, the pivot unit 15 is shown as a releasable pin type having a tubular pin member 16 interiorly threaded to receive a clamping pin member 17. Each of the members includes a similar clamping head 18 overlying the top of the transparencies 7 and the underside of the support 10, respectively, to securely interconnect the transparencies to the support. The attachment however is such as to leave them free to be individually swung or pivoted about the unit 15 and particularly the member 16, For projection and presentation, the supports 11 and 13 are expanded to the L-shaped configuration and secured to the stage 9 which rests upon the top of housing 3.

The stage 9 is shown as a rectangular plate having a transparent portion 19 aligned with the window 2. The transparent portion 19 is somewhat smaller than the size of the transparencies 7. Suitable clamps 20 and 21 are provided on diagonally opposite corners of the stage 9 adjacent the portion 19. The clamps 20 and 21 respectively engage the outer edges of the supports 11 and 13 to hold the magazine 8 on the stage 9 with the pivot pin 15 adjacent the one outer corner of the transparent portion 18.

In the illustrated embodiment of the invention, turn latches are shown for clamps 20 and 21 secured to the upper wall of the stage 9 to permit turning into overlying engagement with the outer edges of the lateral covers and supports 11 and 13. The person presenting the materials may then lift the bound transparencies 7 and select whichever transparency is desired for pivotal or swinging movement from the magazine into overlying relationship on the presentation portion 18.

The stage 9 and the supports 10, 11 and 13 define a supporting area which can be conveniently employed for the several functions required during presentation of a program, as diagrammatically shown in FIG. 3. The base support 10 of course provides the original starting position for the complete magazine of transparencies 7 and portion 18 provides the support for transmission of the information. The adjacent lateral support 11 provides a convenient location for placement of reading material to which the teacher may refer in discussing the information on the transparencies 7 being presented.

Normally, the lecturer would stand to the left side of the stage 9, as viewed in FIG. 3, and place the reference pages and related transparencies in the reading portion. The transparencies 7 are then sequentially moved to the viewing position overlying portion 19. The transparencies 7 are arranged in the magazine 8 for presentation from the bottom to the top of the magazine, although they may be arranged for the more conventional top to bottom sequence or any other desired sequence. For example, adjacent transparencies may be grouped into a plurality of related groups with the groups arranged from top to bottom but with the transparencies within each group arranged for presentation from the bottom to the top.

After the presentation relating to one or more transparencies 7 aligned with the portion 18 is completed, these transparencies 7 are moved to the other lateral cover and support 13 which provides a convenient storage position adjacent to the magazine 8.

In the presentation, the teacher has complete freedom of selection with respect to the bound transparencies 7 and may present any combination. Further, the reference reading material is maintained available during the complete presentation of the related transparencies 7.

After a presentation, the magazine 8 is released from the stage 9 and the lateral supports 11 and 13 folded over the stack of transparencies for convenience of storage, transportation and the like.

If transparencies are to be removed, added or rearranged, the releaseable pin unit 15 readily permits such changes as desired. Further, the magazine pin unit may be constructed of a standard size for a selected maximum number of transparencies and reference sheets and employed with any lesser number.

Although the illustrated embodiment of the invention employs the covers as a support, the transparencies may of course be separately interconnected and disposed on an appropriate stage. In the copending application of Howard A. Milhaupt et al., entitled Transparency Projecting Accessory filed Nov. 28, 1966 and having Ser. No. 597,334, a similar system employing the basic teaching of this application is shown having a particular stage structure as well as further improvements which may advantageously be employed.

The illustrated embodiment of the invention provides a novel and highly satisfactory method of visual presentation of information.

Various modes of carrying out the invention are contemplated as being within the scope of the following claims particularly pointing out and distinctly claiming the subject matter which is regarded as the invention.

I claim:
1. An accessory for projecting information on transparencies for visual display from a transparency projector having a projection surface wherein a pivot means interconnects a stack of transparencies to hold the transparencies in stacked relation at a given pivot axis extending normal to the principal plane of the transparencies and permitting free pivotal movement of each transparency in the plane of the transparency from the stacked position to an exposed viewing position whereby said transparencies may be viewed individually and may also be viewed with several of the transparencies disposed in an exposed overlying position, the improvement comprising a support secured to the projector and defining a plurality of support members adjacent the projection surface of the projector, and means for mounting the transparencies on one of said support members with the pivot means located adjacent the projection surface, at least one other support member being free to receive the transparencies from said stack of transparencies.

2. The improvement in the means of interconnecting a group of transparencies of claim 1 wherein said pivot means includes a pair of releasably interconnected elements to permit disengagement from the transparencies for changing the transparencies in said stack.

3. The improvement in the means of interconnecting the group of transparencies defined in claim 1 wherein securement means are provided in the interconnected magazine of transparencies for cooperative releasable engagement with means carried by the support to mount said transparencies to one side of the projecting surface of the projector for said pivotal movement of the transparencies into engagement with said projection surface.

4. The accessory of claim 1 wherein said stack of transparencies includes a lower self-supporting member at the bottom of the magazine and interconnected thereto by the pivot means.

5. The accessory of claim 1 wherein reference material sheets are interposed as a part of the plurality of stacked references, and the information on the reference material sheets is at right angles to the informational material on said transparencies.

6. The improvement in the means of interconnecting said transparencies for mounting upon said projector as defined in claim 1, having reference material sheets interposed as a part of the plurality of stacked transparencies, and
the pivot means is interconnected with a corner of said stacked transparencies to hold the transparencies in stacked relation and permitting pivotal movement of the transparencies and sheets through at least 270 degrees for the stacked position, and the support forms a part of the magazine for mounting said transparency upon the projector with the pivot means adjacent the corner of the projection surface and diagonal lines through said projection surface and transparencies being aligned with and passing through said pivot means, whereby said transparencies are rotated 90 degrees to a reading position, 180 degrees to an exposed viewing position, and 270 degrees to a temporary stored position, said transparencies being adapted to be viewed individually and with several of the transparencies disposed in an overlying position.

7. The accessory of claim 6 wherein said magazine includes a plurality of different related groups of adjacent transparencies for selective presentation as a group, each of said groups being pivoted as a group with respect to the other groups for arbitrary selection of the order of the group presentation.

8. The accessory of claim 6 wherein said support means is an L-shaped planar unit having three similar support walls defining a base wall to which the transparencies are secured and lateral support walls hinged to the edges of the base wall corner containing the pivot means, said lateral support walls respectively constituting the reading portion and the storage portion.

9. The method of presenting a plurality of transparencies secured into a magazine with a single pivot connection at a corner of said magazine by selective placement of such transparencies singly and in combinations upon a horizontal means having a support portion substantially larger than the magazine and extending laterally in two different directions from the edge of a projection portion to define a plurality of spaced areas, comprising the steps of mounting said transparencies with the pivot connection adjacent an outer edge of the projection portion and with the magazine held on a first spaced area of the support portion, pivoting the transparencies in sequence over the projection portion, and pivoting the transparencies after projection into the second spaced area of the support portion.

10. The method of claim 9 wherein said magazine includes reading sheets and the projection means is a generally rectangular surface divided into quadrants one of which is a projection quadrant and the others of which are the support portion, said magazine being placed in the quadrant having a common diagonal line with the projection quadrant, the further steps of pivoting the reading material to a first quadrant contiguous with the projecton quadrant and pivoting the illustrated transparencies and related reading sheets to the second quadrant contiguous with the projection quadrant.

References Cited

UNITED STATES PATENTS

| 2,560,110 | 7/1951 | Horn | 85—4 |
| 2,797,605 | 7/1957 | Metze et al. | 85—4 |
| 2,813,457 | 11/1957 | Fitz Gerald | 88—24 |
| 3,253,358 | 5/1966 | Wright | 88—24 |
| 3,279,109 | 10/1966 | Whittum | 40—106.1 |

NORTON ANSHER, *Primary Examiner.*

RICHARD M. SHEER, *Assistant Examiner.*

U.S. Cl. X.R.

40—106.1; 353—121